(12) United States Patent
Momoi

(10) Patent No.: US 11,973,888 B2
(45) Date of Patent: Apr. 30, 2024

(54) DECRYPTED PACKET PADDING PROCESSING OR DECYRYPTED PACKET PADDING REMOVAL

(71) Applicant: CANON KABUSHIKI KAISHA, Tokyo (JP)

(72) Inventor: Akiyoshi Momoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/820,075

(22) Filed: Aug. 16, 2022

(65) Prior Publication Data
US 2022/0393889 A1 Dec. 8, 2022

Related U.S. Application Data

(63) Continuation of application No. 16/591,348, filed on Oct. 2, 2019, now Pat. No. 11,444,789, which is a continuation of application No. PCT/JP2018/012510, filed on Mar. 27, 2018.

(30) Foreign Application Priority Data

Apr. 4, 2017 (JP) .................................. 2017-074831

(51) Int. Cl.
*H04L 9/36* (2006.01)
*H04L 9/40* (2022.01)

(52) U.S. Cl.
CPC .............. *H04L 9/36* (2013.01); *H04L 63/166* (2013.01)

(58) Field of Classification Search
CPC ....... H04L 9/36; H04L 63/166; H04L 9/3242; H04L 63/0485; H04L 9/0844; H04L 2209/34
See application file for complete search history.

(56) References Cited

U.S. PATENT DOCUMENTS

| 6,704,871 B1* | 3/2004 | Kaplan | G06F 21/74 713/192 |
| 9,639,935 B1* | 5/2017 | Douady-Pleven | H04N 13/271 |
| 2011/0216708 A1* | 9/2011 | Ling | H04N 21/2381 348/14.02 |
| 2016/0373443 A1* | 12/2016 | Namiki | H04L 63/126 |
| 2017/0116142 A1* | 4/2017 | Abali | G06F 3/0632 |

* cited by examiner

*Primary Examiner* — Bruce S Ashley
(74) *Attorney, Agent, or Firm* — Canon U.S.A., Inc. IP Division

(57) ABSTRACT

In order to improve the efficiency of transfer to outside devices while necessary buffer memory is suppressed, the present invention is an information processing apparatus for decoding a packet that is encrypted in accordance with Transport Layer Security (TLS) protocols and in which a padding portion has a variable length, the information processing apparatus including acquisition means for acquiring an encrypted packet on a unit data basis, decoding means for decoding the encrypted packet on the unit data basis, output means for outputting decoded data obtained through the decoding performed by the decoding means to an external device in accordance with an order in which the decoding is performed by the decoding means, and control means for restricting output to be performed by the output means in a case where a padding pattern is detected from the decoded data obtained through the decoding performed by the decoding means.

11 Claims, 9 Drawing Sheets

… (1)

DECRYPTED PACKET PADDING PROCESSING OR DECYRYPTED PACKET PADDING REMOVAL

CROSS-REFERENCE TO RELATED APPLICATIONS

This application is a Continuation of U.S. patent application Ser. No. 16/591,348, filed Oct. 2, 2019, which is a Continuation of International Patent Application No. PCT/JP2018/012510, filed Mar. 27, 2018, which claims the benefit of Japanese Patent Application No. 2017-074831, filed Apr. 4, 2017, all of which are hereby incorporated by reference herein in their entirety.

TECHNICAL FIELD

The present invention relates to an information processing apparatus, an information processing method, and a storage medium.

BACKGROUND ART

Protocols for encrypting data on the Internet and transferring the encrypted data securely have been widely used. Representative protocols are Secure Socket Layer (SSL) disclosed in NPL 1 and Transport Layer Security (TSL) successor to SSL and disclosed in NPL 2. In recent years, the proportion of secure communication in Internet communication keeps on increasing and is increased to 14 times what it was in 5 years. In contrast, methods for attacking the vulnerability of protocols have also been increasing in recent years. For example, in 2014, Google announced an attack method called Padding Oracle On Downgraded Legacy Encryption (POODLE) disclosed in NPL 3. In this attack method, an attacker can downgrade the version to the SSL 3.0 version, which has vulnerability, and can cause communication to be performed.

As one way to improve security, there is a method for adding Padding. Padding is dummy data to be added to content that is desired to be transmitted and received through communication. It becomes possible to conceal a content length by adding dummy data. In TLS 1.2, Padding has a maximum length of 256 bytes and is defined as a field in a packet. Padding is dummy data and becomes unnecessary after a TLS packet is decoded. In contrast, the amount of data handled by a device keeps on increasing, and a transfer band to a dynamic random access memory (DRAM) has become scarce. Thus it is desired that the efficiency of data transfer to a DRAM be improved. PTL 1 discloses that a transfer band is lowered by not transferring Padding, which is unnecessary for actual processing, to a DRAM in a device for performing TLS packet decoding processing. In the technology disclosed in PTL 1, unnecessary Padding is eliminated using a field having a Padding length contained in a packet.

CITATION LIST

Patent Literature

PTL 1: Japanese Patent No. 05641133

Non Patent Literature

NPL 1: A. Freier, P. Karlton, P. Kocher: "The Secure Sockets Layer (SSL) Protocol Version 3.0", RFC 6101, 1996.

NPL 2: T. Dierks, E. Rescorla: "The Transport Layer Security (TLS) Protocol Version 1.2", RFC 5246, 2008.

NPL 3: Bodo Moller, Thai Duong, Krzysztof Kotowicz: "This POODLE Bites: Exploiting The SSL 3.0 Fallback"

NPL 4: E. Reacorla RTEM, Inc.: "The Transport Layer Security (TLS) Protocol Version 1.3", draft-ietf-tls-tls13-18, 2016

However, in TLS 1.3 disclosed in NPL 4, it is difficult to use the technology disclosed in PTL 1 because the protocols for Padding are changed to improve communication security. That is, to conceal the type of a communication packet and a Content length, a maximum Padding length is increased to $2^{14}-1$ bytes and a Padding length may have a random value. Furthermore, a field indicating a Padding length is eliminated from the packet.

Thus, in TLS 1.3, there is no field indicating a Padding length in the packet, and it is unclear as to from where to where corresponds to actual Content and from where to where corresponds to Padding unless the entirety of the encrypted packet is decoded. Thus, Padding cannot be eliminated with the technology disclosed in PTL 1. In addition, it is conceivable that there could be a method for transferring only Context to a DRAM after the entire packet is decoded and unnecessary Padding is removed. However, in this case, the need to have a buffer memory that can retain data of one packet ($2^{14}-1$ bytes at maximum) arises in an encryption-decoding device.

An object of the present invention is to improve the efficiency of transfer to outside devices while necessary buffer memory is suppressed in an information processing apparatus for decoding packets encrypted in accordance with TLS protocols.

SUMMARY OF INVENTION

An information processing apparatus according to the present invention is an information processing apparatus for decoding a packet that is encrypted in accordance with Transport Layer Security (TLS) protocols and in which a padding portion has a variable length, the information processing apparatus including acquisition means for acquiring an encrypted packet on a unit data basis, decoding means for decoding the encrypted packet on the unit data basis, output means for outputting decoded data obtained through the decoding performed by the decoding means to an external device in accordance with an order in which the decoding is performed by the decoding means, and control means for restricting output to be performed by the output means in a case where a padding pattern is detected from the decoded data obtained through the decoding performed by the decoding means.

Further features of the present invention will become apparent from the following description of exemplary embodiments with reference to the attached drawings.

BRIEF DESCRIPTION OF DRAWINGS

The attached drawings are included in the specification, constitute a portion of the specification, illustrate embodiments of the present invention, and are used to illustrate the principle of the present invention together with the description of the embodiments.

DESCRIPTION OF EMBODIMENTS

First Embodiment

In the following, a present embodiment will be described in detail with reference to the drawings. Note that the following embodiment is a mere example, and the purpose of the embodiment is not to limit the scope of the present invention.

Figure 1:
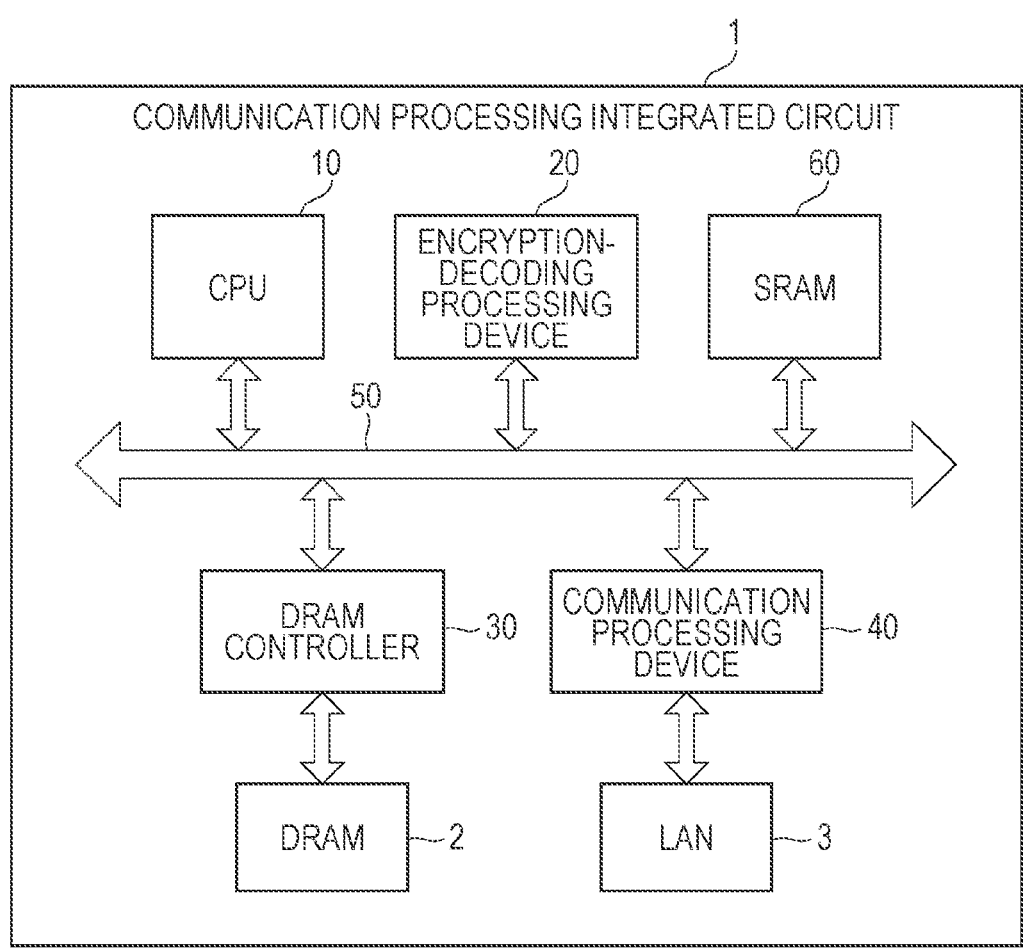
FIG. 1 is a diagram of the configuration of a system according to a first embodiment.

FIG. 1 is a block diagram illustrating the configuration of a communication processing integrated circuit. In the communication processing integrated circuit, a central processing unit (CPU) 10, an encryption-decoding processing device 20, a DRAM controller 30, a communication processing device 40, and a static random access memory (SRAM) 60 are connected to a bus system 50, and data transfer is performed therebetween. This configuration is a typical configuration for an integrated circuit called a system-on-a-chip. Note that a portion or the entirety of the configuration may also be realized by a general personal computer that is operated by a computer program.

Figure 2:
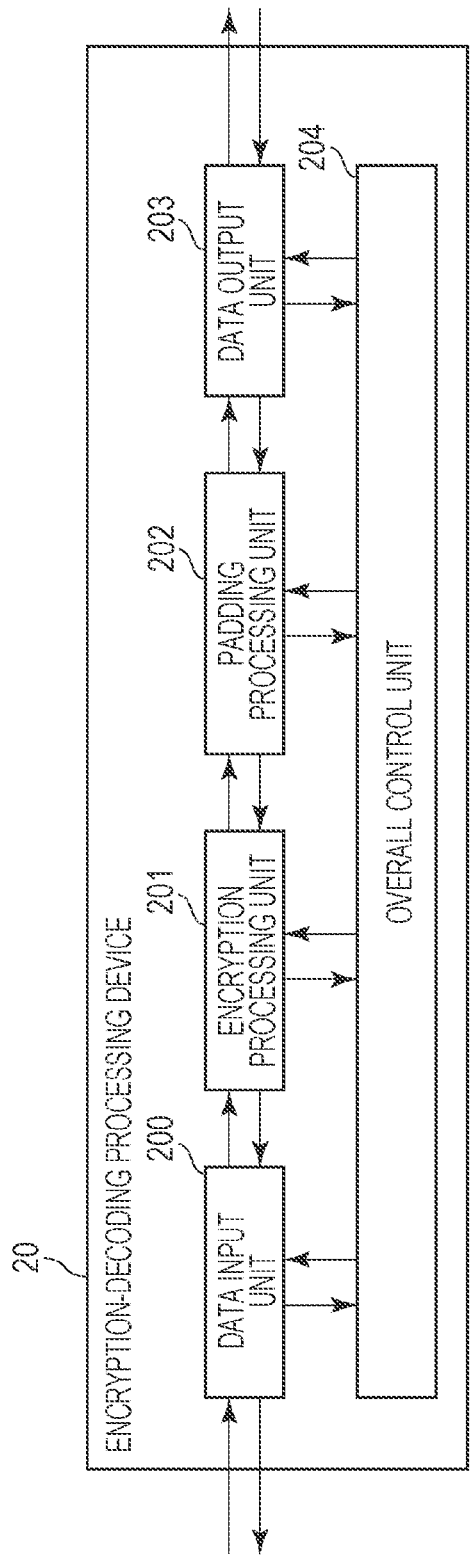
FIG. 2 is a diagram illustrating the configuration according to the first embodiment.
Figure 3:
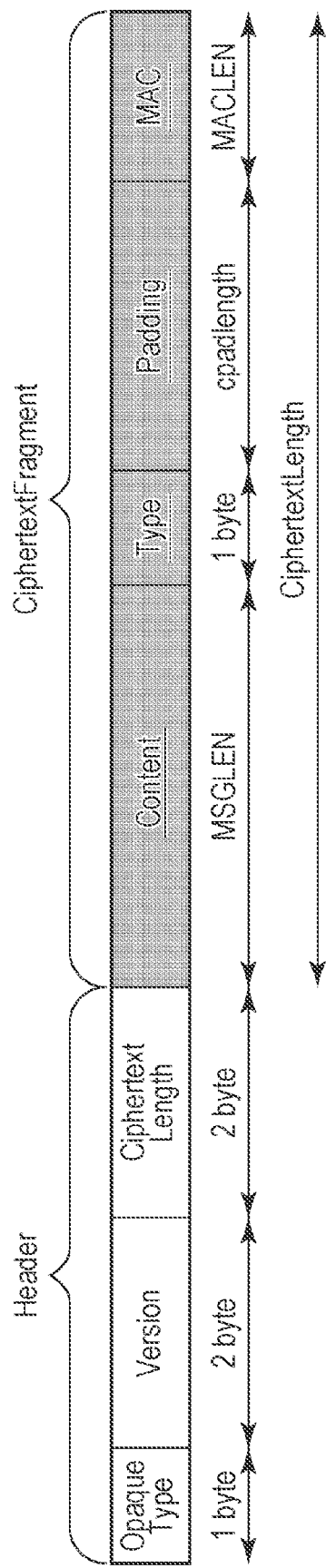
FIG. 3 is a diagram illustrating a TLS 1.3 record layer packet.

FIG. 2 is a diagram of the configuration of the encryption-decoding processing device according to the present embodiment. The encryption-decoding processing device 20 is an information processing apparatus that includes a data input unit 200, an encryption processing unit 201, a padding processing unit 202, a data output unit 203, and an overall control unit 204. Note that the encryption-decoding processing device 20 can perform encryption processing and decoding processing; however, in the present embodiment, the encryption-decoding processing device 20 mainly performs decoding processing. The procedure of typical record layer packet decoding processing in the encryption-decoding processing device 20 will be described. The data input unit 200 acquires an encrypted packet by dividing and reading an encrypted record layer packet that is from an external device such as the SRAM 60 or an external DRAM 2 via the bus system 50. Note that the encrypted packet is, for example, a portion of image pickup data generated by an image capturing device capturing an image. The record layer packet in the present embodiment is based on TLS 1.3 protocols. Note that the record layer packet can be applied to TLS other than TLS 1.3 as necessary. FIG. 3 illustrates the format of a TLS 1.3 record layer packet. The record layer is constituted by a 5-byte Header and a CiphertextLength-byte CiphertextFragment. The Header is constituted by a 1-byte OpaqueType, a 2-byte Version, and a 2-byte CiphertextLength. The OpaqueType has a fixed value of 23, and the Version has a fixed value of 3.1. The CiphertextLength indicates the size of the CiphertextFragment. The CiphertextFragment is an encrypted area and is constituted by MSGLEN-byte Content, a 1-byte Type, Cpadlength-byte Padding, and a MACLEN-byte MAC. The Content is actual data transferred through encrypted communication. The Type indicates the type of a record layer packet to be transferred and has a value that is not 0 and that corresponds to the type of the packet. The Padding has a fixed value of 0, has a variable length, and has an arbitrary random size. The MAC is a MAC value of the CiphertextFragment. The data input unit 200 divides and receives the record layer packet in arbitrary processing units. The data input unit 200 first receives the Header and transmits the Header to the overall control unit 204. Thereafter, the data input unit 200 divides and receives the CiphertextFragment in processing units, and transmits the CiphertextFragment to the encryption processing unit 201. For the overall control unit 204, the CPU 10 sets, for example, a mode indicating encryption processing or decoding processing and an algorithm to be used in encryption processing or MAC processing. In addition, the overall control unit 204 receives the CiphertextLength from the header information received from the data input unit 200. The overall control unit 204 outputs these setting values to the data input unit 200, the encryption processing unit 201, the padding processing unit 202, and the data output unit 203. In addition, when processing ends, the overall control unit 204 notifies the CPU of the value of the Type and that of the MSGLEN received from the padding processing unit 202, which will be described later. The encryption processing unit 201 performs operations for CiphertextFragment encryption processing and decoding processing and MAC processing. As the algorithm to be used in the encryption processing, the decoding processing, and the MAC processing, the algorithm specified by the overall control unit 204 will be used. The decoded data other than the MAC in the decoded CiphertextFragment is output to the padding processing unit. The padding processing unit acquires the decoded data. In contrast, the MAC is compared with a MAC generated through a MAC arithmetic operation performed at the encryption processing unit 201, and a tamper detection operation is performed. The padding processing unit 202 determines whether the decoded division data input from the encryption processing unit 201 is the Content, the Type, or the Padding, and also performs counting for the MSGLEN. The division data determined by the padding processing unit 202 to be the Content is output from the data output unit 203 to the SRAM 60 or the DRAM 2 via the bus system 50. The data determined by the padding processing unit 202 to be the Type and the MSGLEN are output to the overall control unit 204, and are reported to the CPU. The data determined by the padding processing unit 202 to be the Padding is unnecessary data, and thus the data is discarded at the padding processing unit 202. As described above, by restricting output from the data output unit 203 in accordance with the padding processing unit 202, unnecessary data can be prevented from being output to the SRAM 60 or the DRAM 2.

Figure 4:
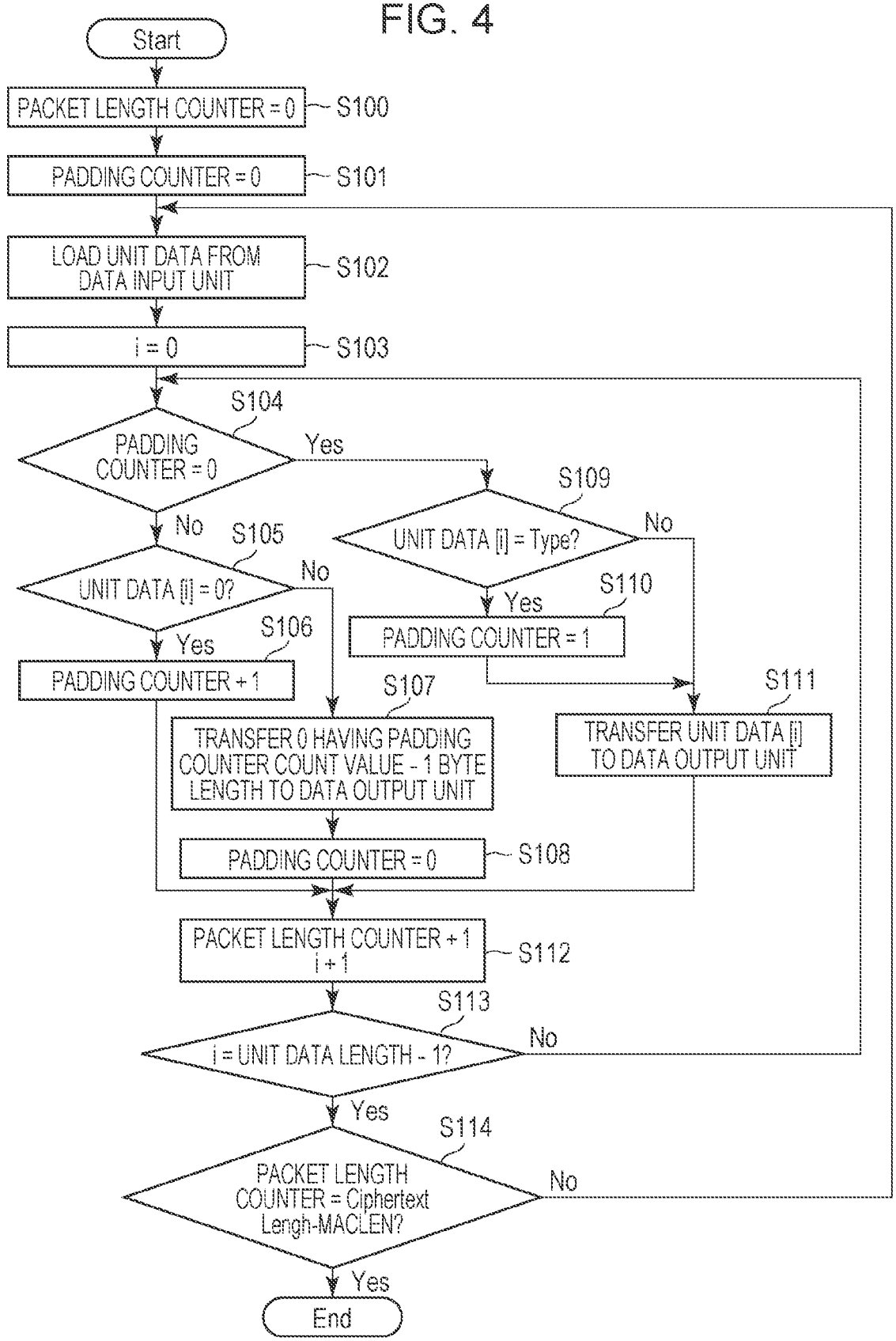
FIG. 4 is a diagram illustrating a process flow chart for a padding processing unit according to the first embodiment.

FIG. 4 illustrates the procedure of processing performed by the padding processing unit 202. In S100, when packet processing is started, a packet length counter is cleared to 0. In S101, a padding counter is cleared to 0. The packet length counter is a counter that performs counting for a processed packet length, and the padding counter is a counter that performs counting for a Padding length after a padding pattern (the Type+the Padding) is detected. Next, in S102, unit data obtained by dividing a packet in processing units is loaded from the data input unit 200. Next, in S103, a unit data byte counter i is set to 0. Next, in S104, it is determined whether the padding counter is 0. In a case where the padding counter is 0, it is in a state in which no padding pattern is detected. In a case where no padding pattern is detected, it is determined in S109 whether the i-th byte element of the unit data is the Type. In a case where the Type is detected, it is determined that the data subsequent to the i-th byte element of the unit data may be the Padding. Thus, after the padding counter is set to 1 in S110, the i-th byte element of the unit data is transferred to the data output unit in S111. Note that the state in which the padding counter is set to 1 is a state in which it is determined that the subsequent data may be the Padding, and thus transfer to the data output unit is temporarily restricted. In a case where no Type is detected in S109, the i-th byte element of the unit data is determined to be the Content. In S111, the i-th byte element of the unit data is transferred to the data output unit. In a case where the padding counter is anything other than 0 in S104, it is determined in S105 whether the i-th byte element of the unit data is 0. In a case where the i-th byte element of the unit data is 0, it is determined that the i-th byte element may be the Padding and the padding counter is incremented by one in S106. In a case where anything other than 0 is detected in S105, the pattern for which it has been determined that it may be the Padding is determined to be not the Padding but the Content. Thus, the transfer to the data output unit which has been temporarily restricted is allowed. Thus, in S107, the count value of the padding counter—1 byte data is filled with zeros and is transferred to the data output unit.

Furthermore, in S108, the padding counter is cleared to 0. Next, in S112, the packet length counter and i are each incremented by one. Next, in S113, whether to end unit data processing is determined by determining whether i is a unit data length—1. In a case where i is the unit data length—1, it is determined in S114 whether the packet length counter is the CiphertextLength—the MACLEN. In a case where the packet length counter is not the CiphertextLength—the MACLEN, the subsequent unit data needs to be processed, and thus the process returns to S102, the subsequent unit data is loaded from the data input unit 200, and the process continues. In contrast, in a case where the packet length counter is the CiphertextLength—the MACLEN, the process has been completed to the end of the packet, and thus the process ends.

Figure 5:
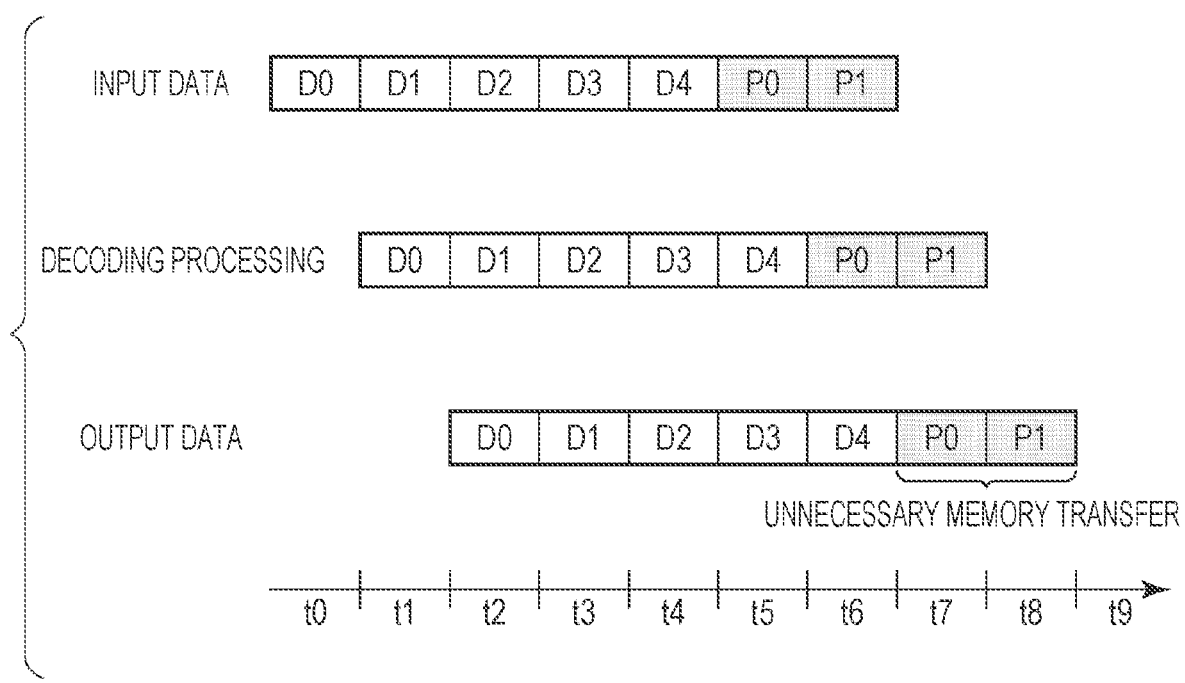
FIG. 5 is a diagram illustrating the number of cycles for encryption decoding processing according to a conventional example.

FIG. 5 illustrates the number of cycles for encryption decoding processing according to a conventional example. Dx indicates Content, and Px indicates padding data. In the conventional example, input data D0 is loaded at t0, and D0 decoding processing is performed at t1. At t2, the D0 resulting from the decoding is output to, for example, a DRAM. In the conventional example, P0 and P1, which are the Padding, are also transferred onto the DRAM at t7 and t8 cycles. Since the Padding is originally unnecessary, this uses a band unnecessarily.

Figure 6:
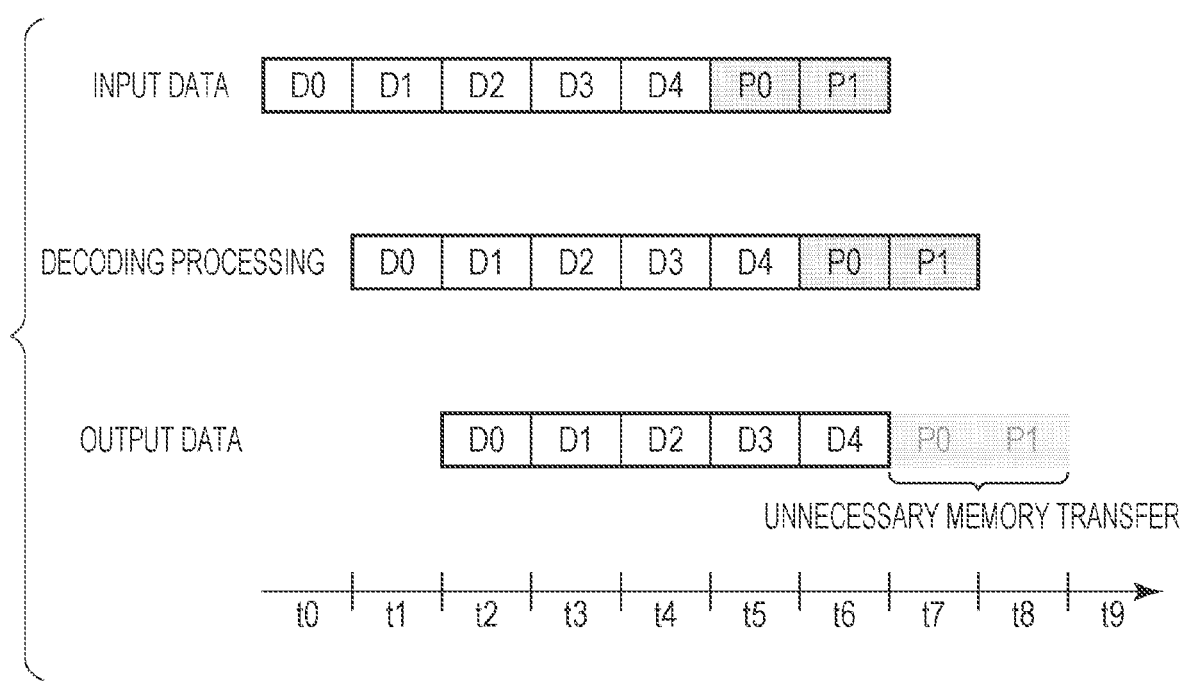
FIG. 6 is a diagram illustrating the number of cycles for encryption decoding processing according to the first embodiment.

FIG. 6 illustrates the number of cycles for encryption decoding processing according to the present embodiment. In the present embodiment, after the encryption decoding processing is performed, the padding processing unit performs a padding determination and elimination. Thus, Padding P0 and P1 are not output to the outside of the encryption-decoding processing device. Consequently, the band of the bus and that of the DRAM are not unnecessarily used, and the transfer at the t7 and t8 cycles can be omitted. The effect of omitting unnecessary transfer according to the present embodiment depends on the ratio between the Content and the Padding contained in a packet. Desirably, the Padding has a random size in terms of security. In addition, the greater the maximum value of the possible size, the greater the variance, and thus it becomes possible to conceal the data length to a higher degree, thereby being considered to be more secure in terms of security. The percentage of memory access that can be reduced by the present invention is determined on the basis of the average proportion of the Padding length in the packet. For example, when the average proportion of the Padding in the packet is 25%, the present invention makes it possible to reduce the memory access by 25%.

Figure 7:
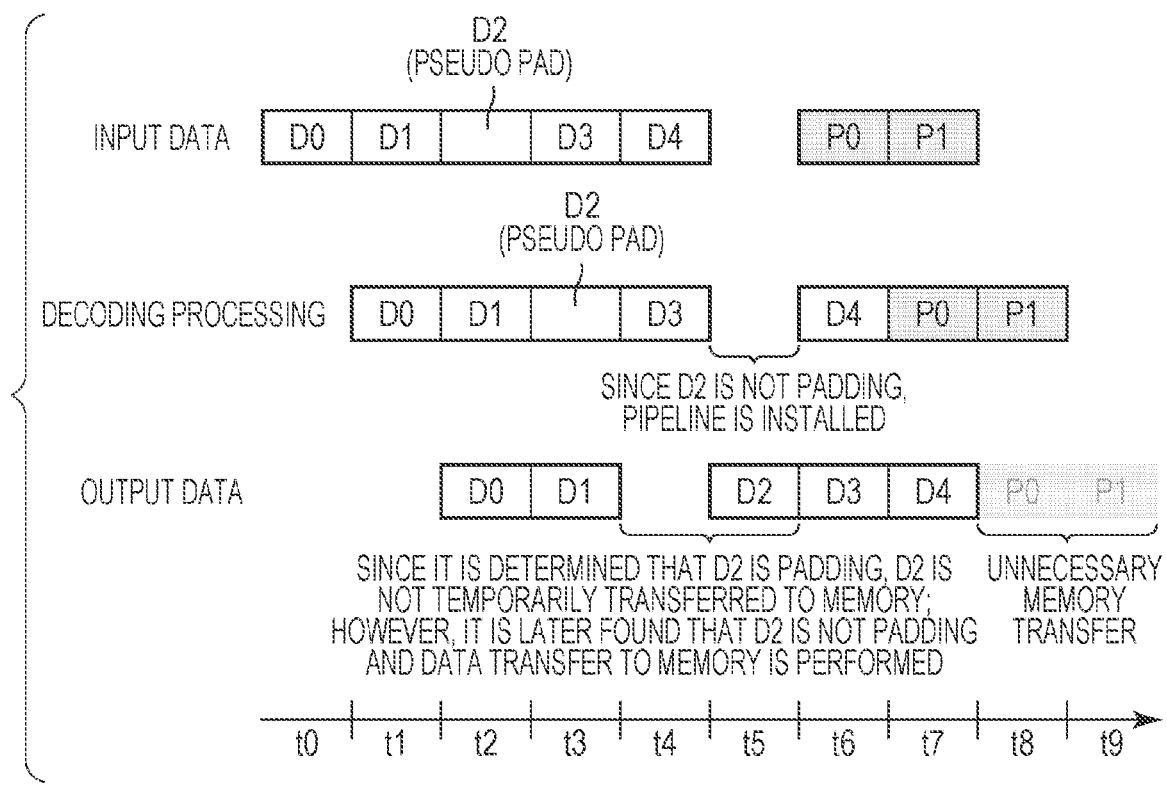
FIG. 7 is a diagram illustrating the number of cycles for encryption decoding processing according to the first embodiment (in a case where pseudo Padding is contained in data).

FIG. 7 illustrates the number of cycles for encryption decoding processing according to the present embodiment and performed in a case where a pseudo padding pattern D2 is contained in the Content. The padding processing unit detects the pseudo padding pattern D2 and does not perform data transfer to the data output unit at a t4 cycle. However, non-zero data is detected in subsequent Content D3, and the data D2, which has been determined to be the Padding, is determined to be the Content. In this case, the D2 needs to be output to the outside of the encryption-decoding processing device, and thus the decoding processing is stalled at a t5 cycle and the pseudo padding pattern D2 is output at t5. In a case where data contains a pattern similar to the Padding, packet processing needs to be stopped to write out, to an outside memory, the padding data that has once been falsely detected, and thus the processing speed decreases. The degree to which the processing speed decreases depends on the proportion of the padding pattern in the data, and overhead processing corresponding to the proportion of the padding pattern in the data is needed. For example, in a case where 5% of data is a padding pattern, additional processing cycles on the order of 5% are required to write out the 5% padding data onto the DRAM. However, it is conceivable that the proportion of the same pattern as the padding pattern in the data is normally significantly small and thus it can be ignored.

Second Embodiment

Figure 8:
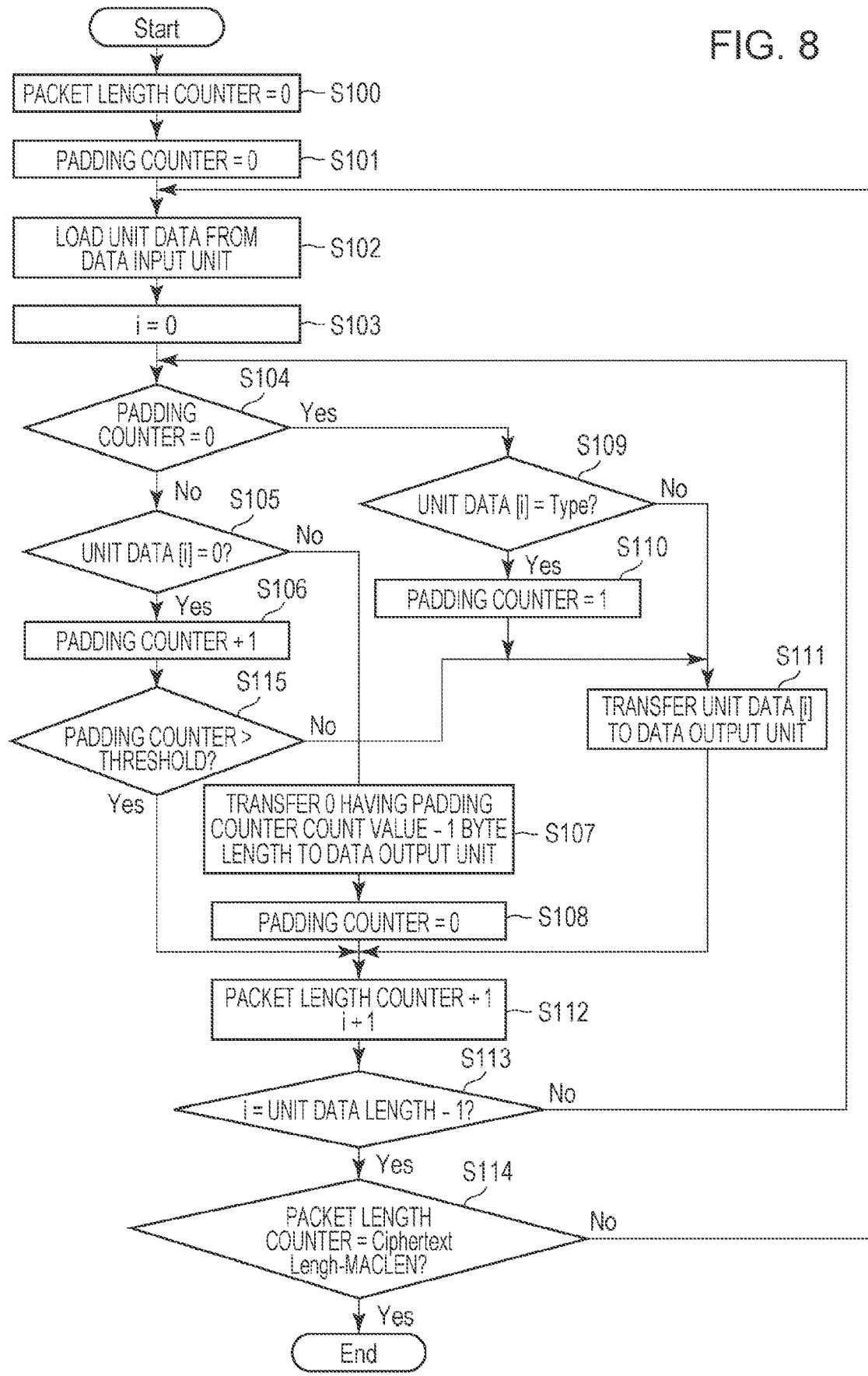
FIG. 8 is a diagram illustrating a process flow chart for a padding processing unit according to a second embodiment.
Figure 9:
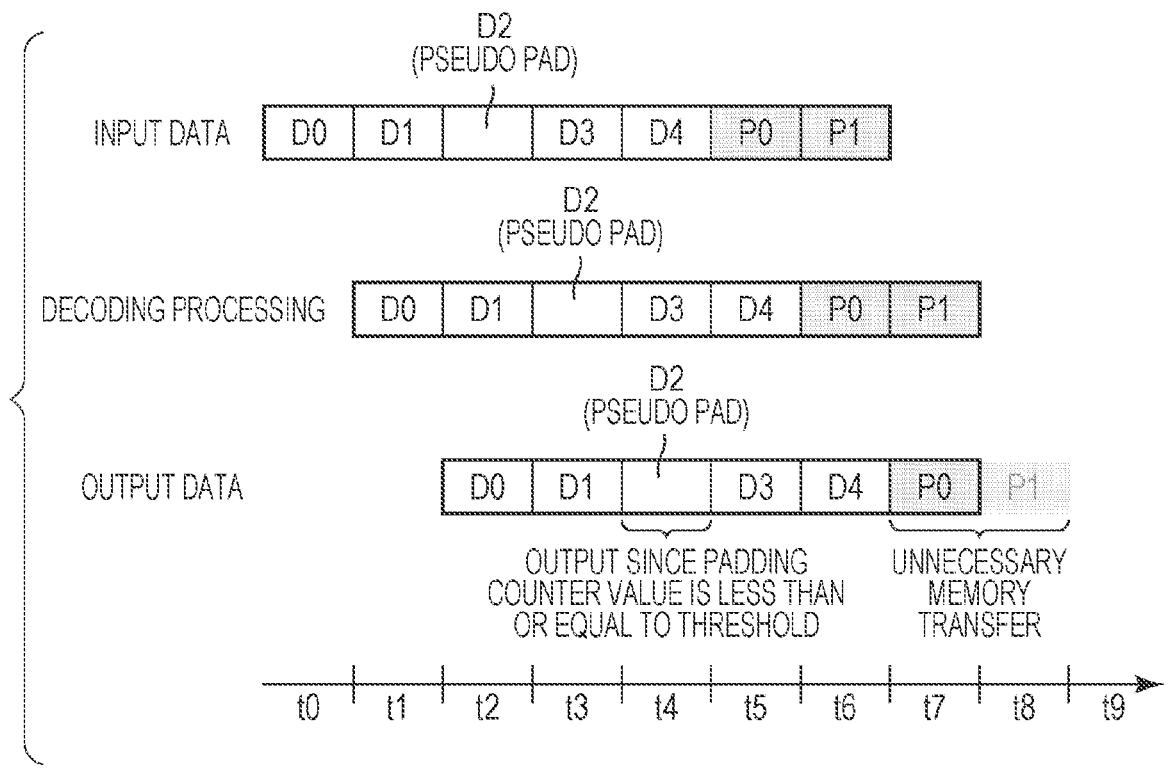
FIG. 9 is a diagram illustrating the number of cycles for encryption decoding processing according to the second embodiment.

FIG. 8 illustrates the procedure of processing performed by the padding processing unit 202 according to a second embodiment. S115 is added to the procedure of processing according to the first embodiment in FIG. 4. In S115, it is determined whether the value of the padding counter is greater than a threshold. In a case where the value is smaller than the threshold, the i-th byte element of the unit data is output in S111. In contrast, in a case where the value is greater than the threshold, the i-th byte element of the unit data is not output. The threshold is a setting value set in advance in the overall control unit 204 by the CPU. By making a comparison with the threshold, a reduction in performance can be prevented in a case where there is a pseudo padding pattern. FIG. 9 illustrates the number of processing cycles according to the present embodiment. In FIG. 7, since the pseudo padding pattern D2 is detected and is not output, a processing stall occurs at t5 and the performance is reduced. In contrast, a pseudo padding pattern whose length is less than or equal to the threshold is regarded as normal Content and is output in the processing cycle according to the present embodiment in FIG. 9, and thus the number of false detections is reduced by reducing the occurrence of stalls, thereby improving the performance.

Other Exemplary Embodiment

The present invention can also be realized through processing performed by reading out and executing a program that realizes at least one of the functions of the above-described embodiments using at least one processor of a computer of a system or device, the program having been supplied to the system or device via a network or a storage medium. In addition, the present invention can also be realized by a circuit (for example, an application specific integrated circuit (ASIC)) for realizing the at least one of the functions.

According to the present invention, the efficiency of transfer to outside devices can be improved while necessary buffer memory is suppressed in an information processing apparatus for decoding packets encrypted in accordance with TLS protocols. The other characteristics and advantages of the present invention will be clear from the following description with reference to the attached drawings. Note that, in the attached drawings, the same or substantially the same configurations are denoted by the same reference numerals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus for decoding a packet that is encrypted in accordance with Transport Layer Security (TLS) protocols and in which a padding portion has a variable length, the information processing apparatus comprising:
   at least one circuit configured to function as:
      a decoding unit configured to decode an encrypted packet;
      an output unit configured to output decoded data obtained through the decoding performed by the decoding unit on a unit data basis; and
      a control unit configured to suspend the output to be performed by the output unit in a case where a pattern detected from the decoded data obtained through the decoding performed by the decoding unit is initially detected to be a part of the padding portion, and to resume the output by the output unit of the decoded data initially detected to be a part of the padding portion in a case where the pattern is not a padding pattern.

2. The information processing apparatus according to claim 1, wherein the control unit suspends the output to be performed by the output unit, in a case where a padding pattern is detected from the decoded data obtained through the decoding performed by the decoding unit until a pattern different from the padding pattern is detected from the decoded data obtained through the decoding performed by the decoding unit.

3. The information processing apparatus according to claim 2, wherein the control unit allows the output to be performed by the output unit, in a case where a pattern different from the padding pattern is detected from the decoded data obtained through the decoding performed by the decoding unit after the padding pattern is detected.

4. The information processing apparatus according to claim 1, wherein the padding pattern is formed by repeating a value of zero.

5. The information processing apparatus according to claim 4, wherein the padding pattern is a pattern subsequent to a value indicating a type of the packet.

6. The information processing apparatus according to claim 1, wherein the padding pattern is a padding pattern defined in accordance with protocols.

7. The information processing apparatus according to claim 6, wherein the padding pattern is a padding pattern defined in accordance with TLS protocols.

8. The information processing apparatus according to claim 1, wherein the padding pattern is formed by repeating a fixed value a predetermined number of times.

9. The information processing apparatus according to claim 1, wherein the encrypted packet is a portion of image pickup data generated by an image capturing device.

10. An information processing method for decoding a packet that is encrypted in accordance with Transport Layer Security (TLS) protocols and in which a padding portion has a variable length, the information processing method comprising:
    decoding, by a decoding unit, an encrypted packet;
    outputting, by an output unit, decoded data obtained through the decoding performed by the decoding unit on a unit data basis; and
    suspending, by a control unit, the output to be performed by the output unit in a case where a pattern detected from the decoded data obtained through the decoding performed by the decoding unit is initially detected to be a part of the padding portion, and to resume the output by the output unit of the decoded data initially detected to be a part of the padding portion in a case where the pattern is not a padding pattern.

11. A non-transitory computer-readable storage medium storing a program causing an information processing apparatus for decoding a packet that is encrypted in accordance with Transport Layer Security (TLS) protocols and in which a padding portion has a variable length to execute an information processing method, the information processing method comprising:
    decoding, by a decoding unit, an encrypted packet;
    outputting, by an output unit, decoded data obtained through the decoding performed by the decoding unit on a unit data basis; and
    suspending, by a control unit, the output to be performed by the output unit in a case where a pattern detected from the decoded data obtained through the decoding performed by the decoding unit is initially detected to be a part of the padding portion, and to resume the output by the output unit of the decoded data initially detected to be a part of the padding portion in a case where the pattern is not a padding pattern.

* * * * *